United States Patent [19]

Iijima

[11] 4,173,771
[45] Nov. 6, 1979

[54] HIGH SPEED PREDICTIVE ENCODING AND DECODING SYSTEM FOR TELEVISION VIDEO SIGNALS

[75] Inventor: Yukihiko Iijima, Tokyo, Japan

[73] Assignee: Nippon Electric Co., Ltd., Tokyo, Japan

[21] Appl. No.: 926,349

[22] Filed: Jul. 20, 1978

[30] Foreign Application Priority Data

Jul. 20, 1977 [JP] Japan .................. 52/87773

[51] Int. Cl.² .............................. H04N 7/12
[52] U.S. Cl. .................... 358/135; 358/260
[58] Field of Search ............. 358/133, 135, 136, 260; 383/261; 340/347 DD

[56] References Cited

U.S. PATENT DOCUMENTS

| | | | |
|---|---|---|---|
| 3,769,451 | 10/1973 | Connor | 358/135 |
| 3,804,975 | 4/1974 | Abe | 358/260 |
| 4,093,962 | 6/1978 | Ishiguro et al. | 358/135 |
| 4,133,006 | 1/1979 | Iinuma | 358/136 |

OTHER PUBLICATIONS

Connor et al. "Intraframe Coding for Picture Transmission."
Haskell et al. "Interframe Coding for Video-Telephone Pictures" Proc. IEEE., vol. 60, No. 7, 7-72, pp.779-799.
Ishiguro et al. "Composite Interframe Coding of NTSC Color T.V. Signals," Comf. Rec., Nat. Tele. Conf.

*Primary Examiner*—Robert L. Richardson
*Assistant Examiner*—Edward L. Coles
*Attorney, Agent, or Firm*—Sughrue, Rothwell, Mion, Zinn and Macpeak

[57] ABSTRACT

A high speed predictive encoding and decoding system for frequency band compression of television video signals has a transmitting unit and a receiving unit coupled by a transmission link for transmitting a video signal produced through a repeated horizontal and vertical scanning of an optical image. The transmitting unit comprises an A/D converter for digitizing said video signal to provide a series of digitized video codewords at the rate of the sampling of said video signal for digitizing; means, including a pair of memory means for temporarily storing two successive segments of said codeword series segment, for interleaving said codewords of one segment with those of an immediately neighboring segment; and means for predictive encoding of the output of said interleaving means, to provide a series of codewords representative of the predictive encoding output alternately of the neighboring segments. The receiving unit comprises means for predictive decoding of the output of said predictive encoding means; means, including a pair of memory means having a capacity equal to that of the memory means at the transmitting unit, for separating the predictive encoding output for one of the segments from that of the other of the segments through a signal processing inverse to that performed at said interleaving means; and means for converting into an analog signal the output of said separating means.

3 Claims, 5 Drawing Figures

HIGH SPEED PREDICTIVE ENCODING AND DECODING SYSTEM FOR TELEVISION VIDEO SIGNALS

BACKGROUND OF THE INVENTION

The present invention relates to a high speed predictive encoding and decoding system for frequency band compression of television video signals.

A television video signal produced through the horizontal and vertical scanning of an optical image has a high degree of correlation between neighboring scanning lines, neighboring picture elements and successive frames. To reduce the amount of information to be transmitted for frequency band compression, the so-called predictive encoding system has been proposed. One example of the predictive encoding system is of the intraframe type, in which the correlation is taken between the neighboring scanning lines or neighboring picture elements by subtracting from the present video signal level a predicted signal level corresponding to the level taken one scanning period or one picture element period earlier. Another example is of the interframe type, in which the predicted signal level corresponds to the level taken one frame period earlier.

For the details of the intraframe and interframe predictive encoding system, reference is made to the articles by Connor et al. entitled "Intraframe Coding for Picture Transmission", and Haskell et al. "Interframe Coding for Videotelephone Pictures", *Proceedings of the IEEE*, Vol. 60, No. 7, July 1972, pp. 779 to 799 (Literature 1).

A more sophisticated version of the predective encoding system based on the combination of the intraframe and interframe predictive encoding system has been proposed in the U.S. patent application Ser. No. 844,857 filed on Oct. 25, 1977, and assigned to the assignee of this application.

However, these conventional systems require high speed logic and memory circuits, because the subtraction of the digitized prediction signal from the incoming encoded video signal, and the quantization of the result of subtraction must be completed in one video sampling period, e.g., $10^{-7}$ second. This tends to make the system as a whole very costly to manufacture.

SUMMARY OF THE INVENTION

An object of the present invention is therefore to provide a high speed predictive encoding and decoding system for the frequency band compression of television video signals without resorting to high-speed circuit elements otherwise required in conventional systems.

The present system has a transmitting unit and a receiving unit coupled by a transmission link for transmitting a video signal produced through a repeated horizontal and vertical scanning of an optical image. The transmitting unit comprises an A/D converter for digitizing said video signal to provide a series of digitized video codewords at the rate of the sampling of said video signal for digitizing; means, including a pair of memory means for temporarily storing two successive segments of said codeword series segment by segment, for interleaving said codewords of one segment with those of an immediately neighboring segment; and means for predictive encoding of the output of said interleaving means, to provide a series of codewords representative of the predictive encoding output alternately of the neighboring segments. The receiving unit comprises means for predictive decoding of the output of said predictive encoding means; means, including a pair of memory means having a capacity equal to that of the memory means at the transmitting unit, for separating the predictive encoding output for one of the segments from that of the other of the segments through a signal processing inverse to that performed at said interleaving means; and means for converting into an analog signal the output of said separating means.

The present invention gives two video sampling periods for every cycle of logic operations needed for the predictive encoding. Those high-speed circuit elements required for conventional systems may therefore be replaced with low-speed, less expensive elements to achieve a performance comparable to that of the conventional systems. Similarly, the present invention makes it possible to increase the video sampling frequency and associated clock pulse repetition frequency if such increase is required.

BRIEF DESCRIPTION OF THE DRAWINGS

Now the present invention will be described in greater detail in conjunction with the accompanying drawings, in which.

DESCRIPTION OF THE PREFERRED EMBODIMENT

Figure 1:
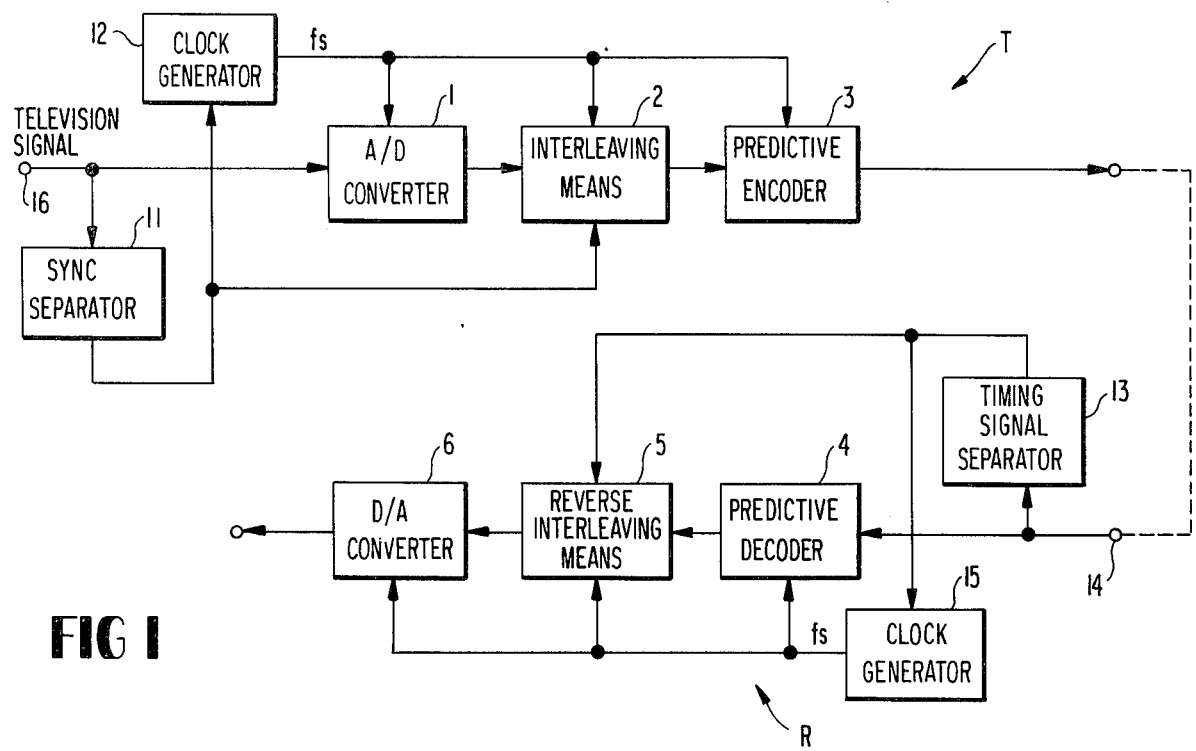
FIG. 1 is a block diagram of one embodiment of the present invention.

Referring to FIG. 1, the embodiment shown therein has a transmitter unit T and a receiver unit R. The transmitter unit T has an A/D converter 1 for digitizing a television signal supplied through an input terminal 16 with a sampling frequency $f_s$. The digitized video signal, which is a PCM signal with 8 digits assigned to every sampled picture element, is then supplied to an interleaving means 2 to be described later. The output of the interleaving means 2 is subjected to the correlation-taking process at a predictive encoding means 3 for the frequency band compression. The horizontal synchronizing pulse is separated from the input video signal at sync separating circuit 11 and supplied to a clock pulse generator 12 and the interleaving means 2.

The clock pulse of the sampling frequency $f_s$, e.g., 10.74 MHz is supplied to the A/D converter 1, the interleaving means 2 and the predictive encoding means 3. Another clock pulse synchronized with the sampling-frequency clock pulse (frequency being equal to 8 $f_s$) is generated within the A/D converter 1 for the PCM encoding.

Of the structural elements of the units T and R, those except the interleaving means 2 and reverse-interleaving means 5 may be made of well-known circuits. The description hereunder will therefore be concentrated on these means 2 and 5.

Referring further to FIG. 1, the receiver unit R has a predictive decoding means 4 for prediction-decoding the incoming digital signal supplied through a transmission line (shown in dotted line) and an input terminal 14, a reverse-interleaving means 5, and a D/A converter 6. A clock pulse generator 15 is provided for supplying sampling-frequency clock pulses to the means 4, 5 and 6. A timing signal separating circuit 13 connected to the input terminal 14 separates a synchronizing signal for setting the time base of the operation of the receiver unit R and supplies it to the reverse-interleaving means 5.

Figure 2:
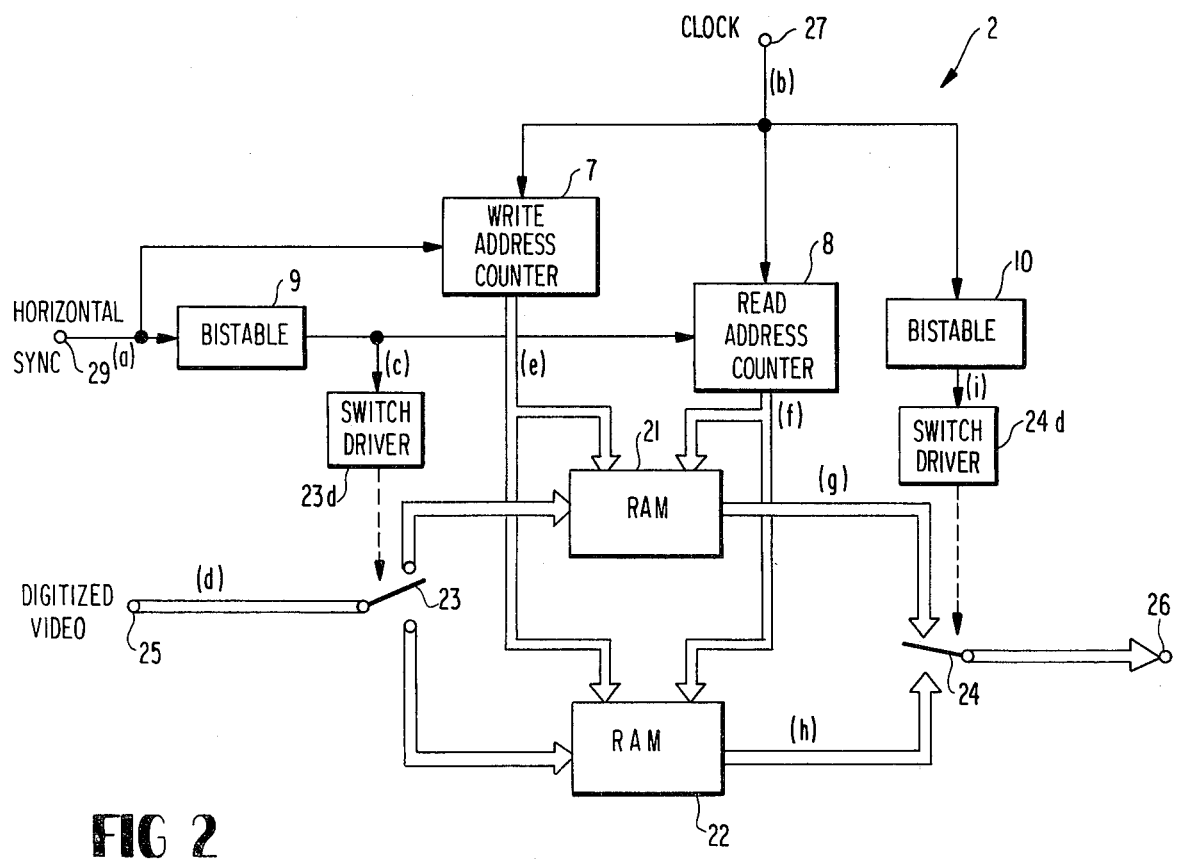
FIG. 2 is a detailed block diagram of the interleaving means.

Referring to FIG. 2, the interleaving means 2 has an input terminal 25 for receiving the digitized video signal in a series of 8-digit parallel codewords representative respectively of the signal levels of the picture elements successively sampled at the sampling frequency clock pulse. The digitized video signal is supplied to a pair of random-access memories (RAMs) 21 and 22 through a first switching means 23, which is driven by a first switch driver means 23d to connect the input terminal 25 to the memories 21 and 22 alternatively in response to the output of a bistable circuit 9 driven by the horizontal synchronizing signal supplied at sync input terminal 29 from the sync separating circuit 11 (FIG. 1). Each of the memories 21 and 22 has a capacity for picture elements lying in one horizontal scanning period, each of the picture elements being represented by an 8 bit parallel codeword, i.e., 8 bit×684=5472 bits. Also, the switching means 23 is driven upward and downward at an interval of the horizontal sync signal, i.e., the horizontal scanning period. Thus, a first one-horizontal-line long segment of the digitized video signal is stored in the memory 21, a second one in the memory 22, a third one in the memory 21 and fourth one in the memory 22 and so forth. To enable the write-in at memories 21 and 22 in the above-mentioned fashion, a write address counter 7 supplies a 10-bit parallel write address codes at a rate of the sampling frequency clock pulse in synchronism with the horizontal sync pulse. The write address codes are decoded at the respective memories 21 and 22 to effect the scanning-like actuations of the 8-bit parallel memory cell arrays from one end to the other.

The read-out of the memories 21 and 22 is controlled by a read address counter 8 which is identical in circuit construction to the write address counter 7 and generates read-out address to effect the scanning of the 8-bit parallel memory cell arrays. The 10-bit parallel read address codes are timed with the write address codes so that the read-out follows the write-in one video codeword period behind the write-in. The storage contents at the respective 8-bit parallel cell arrays accessed successively appear at the output of the memories 21 and 22, and are selected by a second switch 24, which is driven by a second switch driver means 24d to derive the read-out outputs of the memories 21 and 22 alternatingly in response to a second bistable circuit 10. In contrast to the first bistable circuit 9 driven by the horizontal sync pulse, the second bistable circuit 10 is driven by the sampling-frequency clock pulse supplied through terminal 27. The alternate upward and downward switching of the movable contact of the second switching means 24 is therefore at the rate of the sampling pulse.

Figure 5:
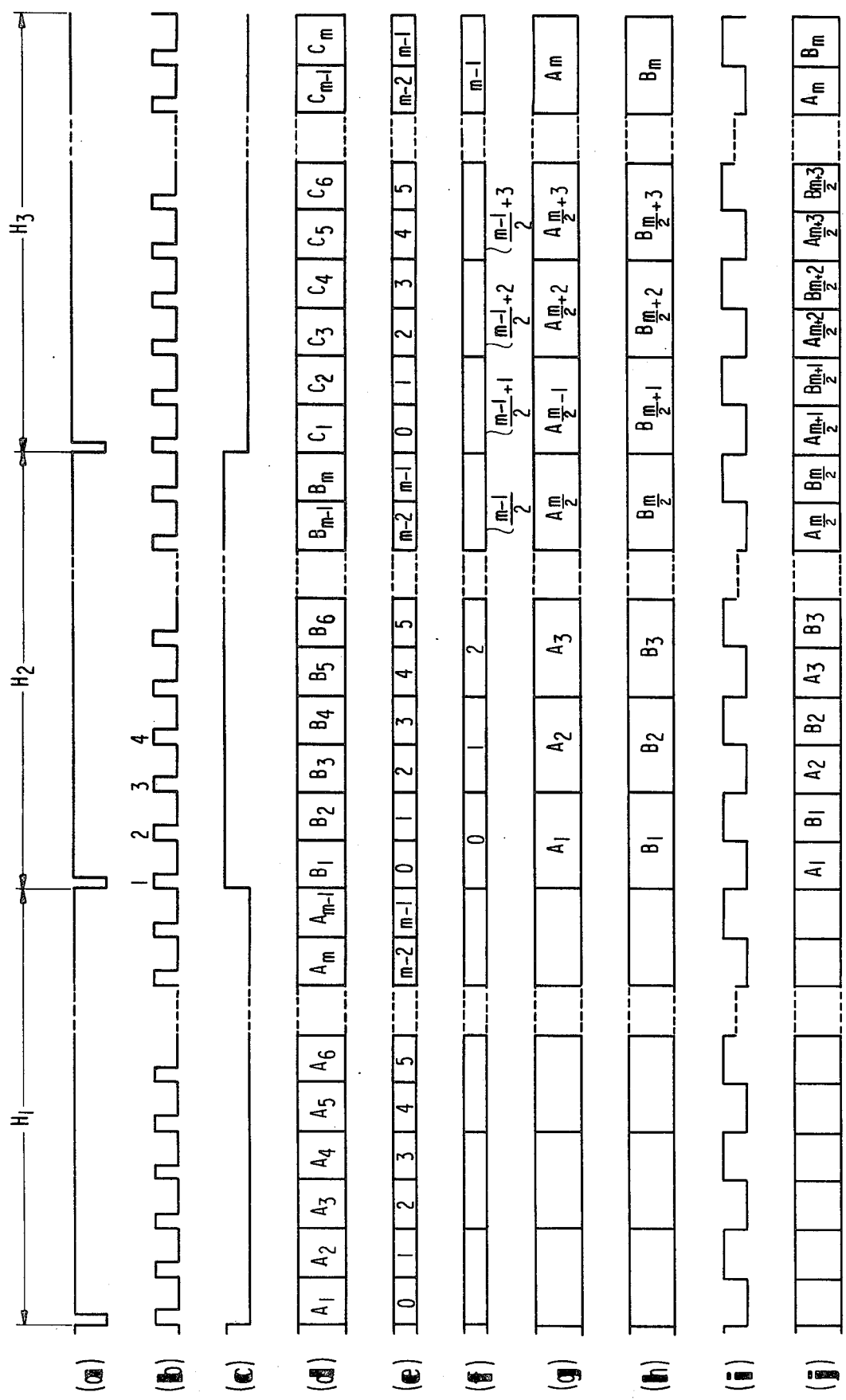
FIG. 5 is a time chart for describing the operation of the embodiment.

Now the operation of the interleaving means 2 will be described in more detail referring also to the time chart shown in FIG. 5, in which waveforms (a) to (j) represent those of the signals observed at the points denoted in FIG. 2 by the corresponding reference characters. It is assumed that in the first horizontal scanning period H1, the switch 23 selects the memory 21 in response to the binary "0" state of the switch control input (c) to the switch driver 23d. During this period, the first one-horizontal-line long segment (d) $A_1 \sim A_m$ of the digitized video signal is successively written in the corresponding addresses in the memory 21 in response to the write addresses (e) given from the write address counter 7 at the same rate as the sampling frequency $f_s$ (b). The read addresses are fed from the read address counter 8 to the memory 21 and 23 after a delay of one horizontal scanning period, so that no codeword is read out from the memory 21 nor from the memory 22 during this period H1.

In the second horizontal scanning period H2, the switch 23 selects the memory 22 in response to the binary "1" state of the switch control input (c). For this reason, in the first clock period 1 among the second horizontal scanning period H2, the first codeword $B_1$ of the second one-horizontal-line long digitized video signal segment is written in at the first address of the memory 22. On the other hand, in this clock period, the first codeword $A_1$ stored in the memory 21 and the first codeword $B_1$ just stored in the memory 22 in the first clock period 1 are respectively read out to allow only the first codeword $A_1$ to be outputed to the output terminal 26 because of the movable contact of the switch 24 connected to the memory 21 under the binary "0" state of the switch control input (i). In the second clock period 2, the second codeword $B_2$ is written in the memory 22 while the first codeword $B_1$ is outputed because of the movable contact of the switch 24 now turned to the memory 22 in response to the binary "1" state of the switch control input (i). In the third clock period 3, the third codeword $B_3$ is written in the memory 22 while the second codewords $A_2$ and $B_2$ are respectively read out from the memories 21 and 22 to allow only the second codeword $A_2$ to be outputed. In the fourth clock period 4, the fourth codeword $B_4$ is written in memory 22 while the remaining second codeword $B_2$ is outputed. In this way, in the second horizontal scanning period H2, the respective first codewords $A_1 \sim A_{m/2}$ and $B_1 \sim B_{m/2}$ of the first and second digitized video signal segments stored in the memories 21 and 22, respectively, are read out from the corresponding addresses according to the read addresses (f) and are interleaved as shown FIG. 5(j).

In the third horizontal scanning period H3 in which the switch 23 selects the memory 21 again, the third digitized video signal segment (d) $C_1 \sim C_m$ is written in the line memory 21, and at the same time the remaining latter codewords $A_{m/2+1} \sim A_m$ and $B_{m/2+1} \sim B_m$ of the first and second digitized video signal segments stored in the memories 21 and 22 are read out alternately.

Then, in the fourth horizontal scanning period H4 (not shown), the fourth digitized video signal segment (d) written in the memory 22, and the respective first codewords of the third and fourth digitized video signal segments stored in the memories 21 and 22 are read out. In the fifth horizontal scanning period H5 (not shown), the fifth digitized video signal segment is written in the memory 21, while the remaining latter half of the third and fourth digitized video signal segments are read out. In the above-described manner, the two horizontal-line-long digitized video signal segments are arranged interleaved in two successive horizontal scanning period pairs (H2)-(H3) and (H4)-(H5) as shown at (j) in FIG. 5.

Figure 3:
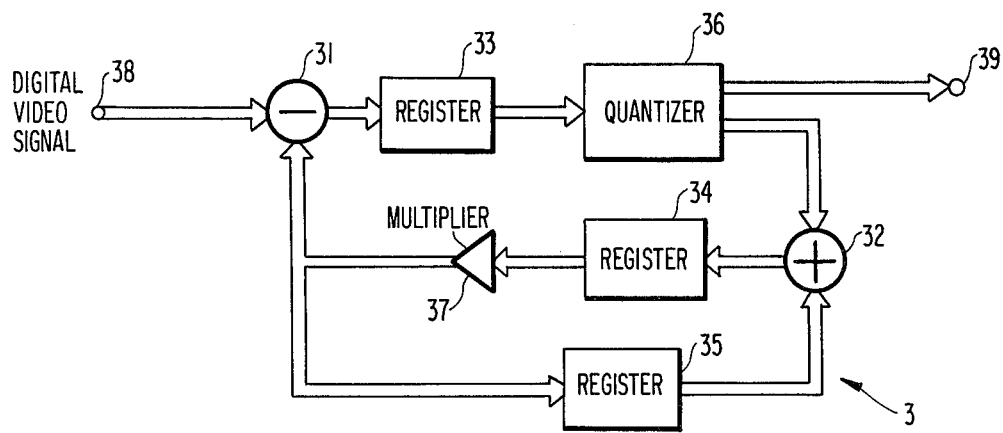
FIG. 3 is a detailed block diagram of the predictive encoding means.

Referring to FIG. 3, the predictive encoding means 3 has a subtractor 31 for providing a digital signal representative of the difference between digital video signal (j) supplied through an input terminal 38 and the prediction reference signal fed from a multiplier to be described later. The output of the subtractor 31 is delayed by one clock period at a first register 33, which serves as a delay means. The delayed difference signal is then quantized at a quantizer 36 to provide a digital signal representative of the difference for transmission through an output terminal 39. An adder 32 is also provided for providing the sum of the output of the quantizer 36 and the prediction reference signal supplied through a second register 35, which serves as a delay means 35. The output of the adder 32 is delayed by a third delay means for giving a delay of one clock period to the output signal of the adder 32, and multiplied by a multiplier 37 for multiplication of the output signal by a factor $\alpha$ ($0<\alpha\leq1$) to form the prediction reference signal.

To describe the operation of the predictive encoding means 3 of FIG. 3, it is assumed that the first codeword $B_1$ of the second horizontal scanning period H2 is supplied for the interleaving means 2 and followed by the second codeword $B_2$. When the latter arrives at the input terminal 38, the first codeword $B_1$ has already been processed into a prediction reference code by the circuit elements 31, 32, 33, 34, 35, 36 and 37. Due to the delay given at the delay means 33, 34, and 35, the prediction reference signal fed to the subtractor 31 is in synchronism with the second codeword $B_2$. For details of the predictive encoding means 3, reference is made to FIG. 4 on page 782 of Literature 1. It will be noted that, the incoming codewords $B_1$, $B_2$, etc. are supplied at an interval twice as long as the sampling period. This allows the rate of the incoming data to be one half of the write operation, relaxing the speed requirement for the circuit elements included in those structural elements 31, 32, 33, 34, 35, 36 and 37. The same applies to the other structural element 4 included in the receiving unit R.

Figure 4:
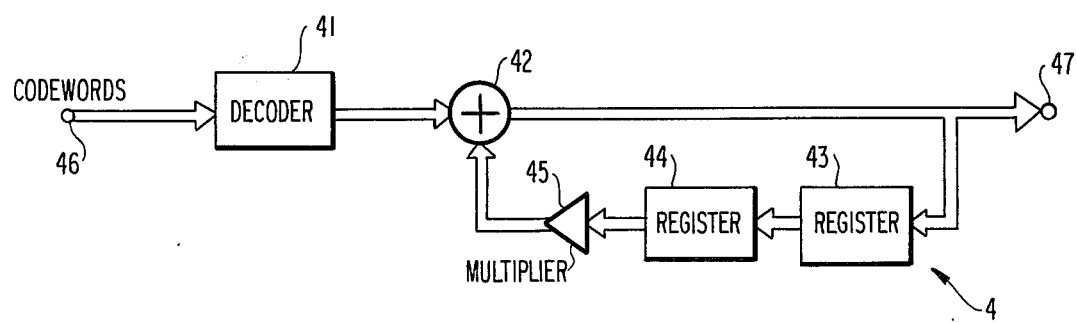
FIG. 4 is a detailed block diagram of the predictive decoding means.

Referring to FIG. 4, an example of the predictive decoding means 4 has a decoder 41 for decoding the prediction-encoded codewords supplied at an input terminal 46 from the encoding means 3 through a transmission line shown in dotted line. The output from the decoder 41 is supplied to an adder 42 for summation with the output of a multiplier 45, which is supplied with the output of the adder 42 through registers 43 and 44, which serve as delay means to respectively give a delay of one clock period. The factor of multiplication at a multiplier 45 for multiplying the output signal of the register 44 is $\alpha$. This predictive decoding means 4 has such a construction that the register 43 corresponding to the register 33 or 35 used in the encoding means 3 of FIG. 3 is added to the predictive decoding means shown in FIG. 4 on page 782 of the Literature 1.

In the receiving unit R, the reverse-interleaving means 5 supplied with the output of the predictive decoding means 4 has exactly the same circuit construction as the interleaving means 2, except that the input digitized difference signal sequence is given to the output terminal 26 rather than to the terminal 25, so that the alternate write-in into the memories 21 and 22 is switched by the switching means 24 at an interval of the sampling pulses while the alternate read-out from the memories 21 and 22 is switched at an interval of the horizontal sync pulses, thereby restoring the digitized video codeword sequence line by line.

The restored digitized video codeword sequence is converted into an analogue signal at the D/A converter 6.

The intraframe prediction encoding/decoding described with respect to the encoding means 3 and decoding means 4 in the embodiment may be the so-called composite interframe predictive encoding/decoding, which is a combination of the simple intraframe prediction encoding and the interframe predictive encoding/decoding as shown in FIGS. 3(a) and 3(b), respectively, of the article by Ishiguro et al. entitled "Composite Interframe Coding of NTSC Color Television Signals" at pp. 6.4-1 to 6.4-5 of the *Conference Record*, 1976 *National Telecommunication Conference*, held in Dallas, Tex. Stated simply, the composite interframe predictive encoding/decoding is identical to the simple intraframe prediction encoding/decoding except that an additional delay means of one frame period is provided to take the additional frame-to-frame correlation.

Also the capacity of the memories 21 and 22 which is for one horizontal-scanning-line-long digitized video signal segment in the embodiment, may be chosen arbitrarily depending on the video signal to be handled.

What is claimed is:

1. A predictive encoding/decoding transmission system having a transmitting unit and a receiving unit coupled by a transmission link for transmitting a video signal produced through a repeated horizontal and vertical scanning of an optical image, wherein said transmitting unit comprises:

an A/D converter for digitizing said video signal to provide a series of digitized video codewords at the rate of the sampling of said video signal for digitizing;

means, including a pair of memory means for temporarily storing two successive segments of said codeword series segment by segment, for interleaving said codewords of one segment with those of immediately neighboring segment, and means for predictive encoding of the output of said interleaving means, to provide a series of codewords representative of the predictive encoding output alternately of the neighboring segments, and wherein said receiving unit comprises;

means for predictive decoding of the output of said predictive encoding means, means, including a pair of memory means having a capacity equal to that of the memory means at the transmitting unit, for separating the predictive encoding output for one of the segments from that of the other of the segments through a signal processing inverse to that performed at said interleaving means, and means for converting into an analog signal the output of said separating means.

2. A predictive encoding/decoding transmission system as claimed in claim 1, wherein said memories at said interleaving means and said separating means have a capacity for a video signal segment lying in the period of one horizontal scanning.

3. A predictive encoding/decoding system as claimed in claim 2, wherein said interleaving means further comprises:

a first switching means responsive to a horizontal synchronizing signal of said video signal for feeding one horizontal-scanning-period long segments of said series of said digitized video codewords to a first and second ones of said memory means alternately;

write address signal generating means for effecting the write-in of said segment of said codeword series in said memory means;

read address signal generating means for effecting the read-out of the stored codeword series at a rate equal to one half of said write address; and second switching means for deriving the read-out output of said memory means alternatingly so that the output of one of the memory means is interleaved with that of the other of said memory means.

* * * * *

UNITED STATES PATENT AND TRADEMARK OFFICE
CERTIFICATE OF CORRECTION

PATENT NO. : 4,173,771
DATED : November 6, 1979
INVENTOR(S) : Yukihiko IIJIMA

It is certified that error appears in the above-identified patent and that said Letters Patent are hereby corrected as shown below:

IN THE SPECIFICATION; the following should be inserted:

Column 5, Line 14-- after "third" insert -- register 34, which serves as a --

Signed and Sealed this

Fourth Day of March 1980

[SEAL]

Attest:

SIDNEY A. DIAMOND

Attesting Officer    Commissioner of Patents and Trademarks